United States Patent
Aravena

(10) Patent No.: US 11,559,376 B2
(45) Date of Patent: Jan. 24, 2023

(54) SCREW-RETAINED ABUTMENT WITH OFF-AXIS FEATURE AND METHODS OF MAKING AND USING SAME

(71) Applicant: Implant Direct Sybron International LLC, Thousand Oaks, CA (US)

(72) Inventor: Ines Aravena, Santa Rosa Valley, CA (US)

(73) Assignee: Implant Direct Sybron International LLC, Thousand Oaks, CA (US)

(*) Notice: Subject to any disclaimer, the term of this patent is extended or adjusted under 35 U.S.C. 154(b) by 0 days.

(21) Appl. No.: 15/281,550

(22) Filed: Sep. 30, 2016

(65) Prior Publication Data

US 2017/0086952 A1 Mar. 30, 2017

Related U.S. Application Data

(60) Provisional application No. 62/235,079, filed on Sep. 30, 2015.

(51) Int. Cl.
*A61C 8/00* (2006.01)
*A61C 13/225* (2006.01)
(Continued)

(52) U.S. Cl.
CPC .......... *A61C 8/0068* (2013.01); *A61C 8/0001* (2013.01); *A61C 8/005* (2013.01);
(Continued)

(58) Field of Classification Search
CPC ... A61C 8/0068; A61C 8/0001; A61C 8/0037; A61C 8/0048; A61C 8/0056;
(Continued)

(56) References Cited

U.S. PATENT DOCUMENTS

| | | |
|---|---|---|
| 4,988,298 A | 1/1991 | Lazzara et al. |
| 5,069,622 A | 12/1991 | Rangert et al. |

(Continued)

FOREIGN PATENT DOCUMENTS

| | | |
|---|---|---|
| CA | 2920441 A1 | 3/2015 |
| EP | 1419746 A2 | 5/2004 |

(Continued)

OTHER PUBLICATIONS

Wadhwani, C. et al., An Esthetic Solution to the Screw-Retained Implant Restoration: Introduction to the Implant Crown Adhesive Plug: Clinical Report, Journal of Esthetic and Restorative Dentistry, Jun. 2011, vol. 138, No. 3, pp. 138-143, retrieved Nov. 19, 2016 from http://onlinelibrary.wiley.com/wol1/doi/10.111/j.1708-8240.2011.00423.x/full>.

(Continued)

*Primary Examiner* — Nicholas D Lucchesi
*Assistant Examiner* — Hao D Mai
(74) *Attorney, Agent, or Firm* — Wood Herron & Evans LLP

(57) ABSTRACT

An abutment is provided with a screw access hole and a slot in its sidewall adapted to allow a driver to access a screw in the screw access hole at an angle relative to a longitudinal axis of the screw. The abutment may include a screw seat and may be connected to an implant via a screw in the screw seat. A prosthesis, which may include a driver access channel that has a diameter less than the outer diameter of the drive portion of the screw, may be placed over the abutment. Methods of making a dental prosthesis and methods of attaching and removing the dental prosthesis from the implant are also disclosed.

17 Claims, 12 Drawing Sheets

(51) Int. Cl.
     *A61C 13/00* (2006.01)
     *A61C 13/34* (2006.01)
     *A61C 9/00* (2006.01)

(52) U.S. Cl.
     CPC .......... *A61C 8/0022* (2013.01); *A61C 8/0037* (2013.01); *A61C 8/0056* (2013.01); *A61C 8/0066* (2013.01); *A61C 8/0089* (2013.01); *A61C 9/004* (2013.01); *A61C 13/0004* (2013.01); *A61C 13/225* (2013.01); *A61C 13/34* (2013.01); *A61C 2201/002* (2013.01)

(58) Field of Classification Search
     CPC . A61C 8/0066; A61C 8/0089; A61C 13/0004; A61C 13/225; A61C 13/34; A61C 2201/002
     See application file for complete search history.

(56) References Cited

U.S. PATENT DOCUMENTS

| | | | |
|---|---|---|---|
| 5,116,225 A * | 5/1992 | Riera | A61C 8/005 433/173 |
| 5,180,303 A * | 1/1993 | Homburg | A61C 8/0048 433/173 |
| 5,302,126 A * | 4/1994 | Wimmer | A61C 8/0022 433/173 |
| 5,316,477 A | 5/1994 | Calderon | |
| 5,362,235 A * | 11/1994 | Daftary | A61C 8/0048 433/172 |
| 5,427,906 A * | 6/1995 | Hansen | A61C 8/0048 433/173 |
| 5,571,016 A * | 11/1996 | Ingber | A61C 8/0001 433/169 |
| 5,577,912 A * | 11/1996 | Prins | A61C 8/005 433/172 |
| 5,662,474 A * | 9/1997 | Jorneus | A61C 8/005 433/172 |
| 5,733,122 A | 3/1998 | Gordon | |
| 5,863,200 A | 1/1999 | Hamada et al. | |
| 5,873,721 A | 2/1999 | Willoughby | |
| D413,383 S * | 8/1999 | Vryonis | D24/156 |
| 5,947,733 A * | 9/1999 | Sutter | A61C 8/005 433/173 |
| 5,989,029 A | 11/1999 | Osorio et al. | |
| 6,012,923 A | 1/2000 | Bassett et al. | |
| 6,126,445 A | 10/2000 | Willoughby | |
| 6,159,010 A * | 12/2000 | Rogers | A61C 8/0048 433/172 |
| 6,287,115 B1 * | 9/2001 | Lustig | A61C 8/0022 433/172 |
| 6,500,003 B2 | 12/2002 | Nichinonni | |
| 6,663,387 B2 | 12/2003 | Riley | |
| 6,663,390 B2 * | 12/2003 | Riley | A61C 8/0048 433/173 |
| 6,848,908 B2 * | 2/2005 | Bjorn | A61C 8/005 433/172 |
| 6,994,547 B1 * | 2/2006 | Sethi | A61C 8/005 433/172 |
| 7,338,286 B2 * | 3/2008 | Porter | A61C 8/0001 433/172 |
| D641,877 S | 7/2011 | Aldecoa | |
| 8,597,023 B2 * | 12/2013 | Zipprich | A61C 8/0053 433/173 |
| 8,944,818 B2 | 2/2015 | Robb et al. | |
| 9,333,057 B2 | 5/2016 | Benzon | |
| 9,522,051 B2 * | 12/2016 | Engman | A61C 8/005 |
| 9,763,758 B2 | 9/2017 | Kopelman | |
| 10,149,741 B2 | 12/2018 | Haus et al. | |
| 10,285,787 B2 | 5/2019 | Bertagnon | |
| 2001/0053512 A1 * | 12/2001 | Nichinonni | A61C 8/005 433/173 |
| 2001/0055743 A1 * | 12/2001 | Yeung | A61C 8/005 433/173 |
| 2003/0162149 A1 * | 8/2003 | Bjorn | A61C 8/005 433/173 |
| 2004/0243126 A1 * | 12/2004 | Carbone | A61B 17/7034 606/279 |
| 2005/0084819 A1 * | 4/2005 | Sims | A61C 8/005 433/173 |
| 2006/0099549 A1 * | 5/2006 | Engman | A61C 8/0077 433/173 |
| 2006/0110706 A1 * | 5/2006 | Jorneus | A61C 8/005 433/173 |
| 2007/0154864 A1 | 7/2007 | Deer et al. | |
| 2008/0233537 A1 | 9/2008 | Amber et al. | |
| 2008/0241790 A1 | 10/2008 | Gittleman | |
| 2008/0311544 A1 | 12/2008 | Lee | |
| 2009/0117520 A1 * | 5/2009 | Kikuchi | A61C 8/0081 433/174 |
| 2009/0246734 A1 * | 10/2009 | Bar Shalom | A61C 8/005 433/173 |
| 2009/0298013 A1 * | 12/2009 | Baruc | A61C 8/005 433/174 |
| 2010/0196853 A1 | 8/2010 | Zipprich et al. | |
| 2012/0237899 A1 | 9/2012 | Holmstrom et al. | |
| 2012/0322030 A1 * | 12/2012 | Fromovich | A61C 8/005 433/173 |
| 2013/0209958 A1 | 8/2013 | Benz et al. | |
| 2014/0147812 A1 | 5/2014 | Ilter et al. | |
| 2015/0313690 A1 | 11/2015 | Elsner | |
| 2016/0081772 A1 * | 3/2016 | Schweiger | A61C 8/0048 433/173 |
| 2016/0213450 A1 * | 7/2016 | Xam-Mar Mangrane | A61C 8/0048 |
| 2016/0242877 A1 | 8/2016 | Bernhard | |
| 2016/0324599 A1 | 11/2016 | Harrison | |
| 2017/0086952 A1 | 3/2017 | Aravena | |

FOREIGN PATENT DOCUMENTS

| | | |
|---|---|---|
| EP | 2127612 A1 | 12/2009 |
| WO | 9714271 A1 | 4/1997 |
| WO | 0038588 A1 | 7/2000 |
| WO | 2001095825 A1 | 12/2001 |
| WO | 2008157137 A1 | 12/2008 |
| WO | 2011034781 A2 | 3/2011 |
| WO | 2012052482 A1 | 4/2012 |
| WO | 2013004387 A1 | 1/2013 |
| WO | 2014064558 A2 | 5/2014 |
| WO | 2014173539 A1 | 10/2014 |
| WO | 2014200404 A1 | 12/2014 |
| WO | 2015040250 A1 | 3/2015 |

OTHER PUBLICATIONS

International Searching Authority, International Search Report and Written Opinion issued in International Application No. PCT/US16/54719, dated Jan. 31, 2017, 15 pages.

European Patent Office, Extended Search Report issued in counterpart Application No. EP16852693.7 dated Dec. 7, 2017, 7 pp.

The International Bureau of WIPO, International Preliminary Report on Patentability in PCT Application Serial No. PCT/US2016/054719, dated Apr. 3, 2018.

U.S. Patent and Trademark Office, Office Action issued in corresponding U.S. Appl. No. 15/637,415 dated Jun. 9, 2020, 21 pages.

European Patent Office, Official Letter issued in EP 16 852 693.7 dated Dec. 15, 2020.

European Patent Office, Official Letter issued in counterpart Application No. EP16852693.7 dated Dec. 16, 2019.

PCT Office, Search Report and Written Opinion issued in PCT/US16/54719 dated Jan. 31, 2017.

Wadhwani, C., et al, An Esthetic Solution to the Screw-Retained Implant Restoration: Introduction to the Implant Crowr Adhesive Plug: Clinical Report. Journal of Esthethic and Restorative Dentistry. vol. 23, No. 3; Jun. 2011.

European Patent Office, Search Report and Written Opinion in EP18159889.7, dated Aug. 8, 2018.

(56) References Cited

OTHER PUBLICATIONS

European Patent Office, Examination Report in corresponding European Patent Application No. 18159889.7 dated Nov. 18, 2019.
U.S. Patent and Trademark Office, Office Action issued in corresponding U.S. Appl. No. 15/637,415, dated Jun. 9, 2020.
European Patent Office, Examination Report issued in corresponding EP 18159889.7 dated Feb. 3, 2021.
U.S. Patent and Trademark Office, Office Action issued in corresponding U.S. Appl. No. 15/637,415 dated Nov. 12, 2020.
European Patent Office, Official Letter issued in EP 16 852 693.7 dated Oct. 15, 2020.
U.S. Patent and Trademark Office, Office Action issued in U.S. Appl. No. 15/637,415 dated Apr. 12, 2021.
U.S. Patent and Trademark Office, Office Action issued in U.S. Appl. No. 15/637,415 dated Sep. 15, 2021.
European Patent Office, Extended Search Report issued in EP 21205711.1 dated Feb. 17, 2022.
European Patent Office, Notice of Opposition filed in EP 16852693.7 dated Aug. 3, 2022.

* cited by examiner

SCREW-RETAINED ABUTMENT WITH OFF-AXIS FEATURE AND METHODS OF MAKING AND USING SAME

CROSS-REFERENCE TO RELATED APPLICATION

This application claims priority to U.S. Provisional Patent Application No. 62/235,079, filed Sep. 30, 2015, the entire content of which is incorporated herein by reference.

TECHNICAL FIELD

The present invention relates generally to screw-retained abutments, and more particularly to screw-retained abutments with an off-axis feature, as well as methods of making and using the same.

BACKGROUND

Edentulism, the condition of being toothless to some extent, may be treated by the implantation of a dental assembly. These assemblies require certain components to rest comfortably and securely in the patient's oral cavity. The implant fixture, also known as the dental implant or simply the implant, is the part of the dental assembly that becomes fused with the patient's jaw bone. The implant is available in both cylinder and screw-type varieties and is typically made from titanium or a titanium alloy. Implant abutments are screwed onto the implant and are positioned at and above the patient's gum line. Finally, a dental prosthesis is placed over the abutment and is designed to look and function like a natural tooth.

Alternatively, the prosthesis may be formed over the abutment outside of the patient's mouth, and the combined prosthesis and abutment may then be affixed to the implant with a fixation screw. To install the abutment and prosthesis onto the implant and to access the fixation screw during repair and maintenance of the dental assembly, the prosthesis must contain a screw access channel. In known dental assemblies, this screw access channel can often reside at the labial side of the tooth or on the biting surface, which is not desired as a matter of strength and aesthetics. Additionally, in known dental assemblies, this screw access channel must be of large enough diameter to allow the screw to traverse the channel. However, as the diameter of the channel increases, the strength of the prosthesis becomes more compromised. Also, a fixation screw that may pass through the screw access channel of the prosthesis increases the risk that the screw may become dislodged and lead to swallowing the prosthesis and/or the fixation screw.

Solutions to the problem of labial access to the fixation screw have been proposed. In one such dental assembly, the screw access channel resides on the lingual side of the prosthesis and is angled relative to the longitudinal axis of the implant. However, the screw access channel still requires a large enough diameter to allow the fixation screw to pass through the prosthesis. Additionally, this dental assembly contains a ceramic abutment affixed to a titanium implant, increasing the likelihood of crack propagation in the ceramic abutment during tightening of the fixation screw, which seats against the ceramic abutment.

Therefore, there is a need for a dental assembly that addresses the present challenges and characteristics discussed above in regard to the screw access channel placement and the interface between the abutment and dental implant.

SUMMARY OF INVENTION

To these ends, an abutment is provided with a screw access hole and a slot in its sidewall adapted to allow a driver to access a screw in the screw access hole at an angle relative to a longitudinal axis of the screw. The abutment may include a screw seat and may be connected to an implant via a screw in the screw seat.

In another aspect of the invention, a dental assembly may include the abutment and a screw within the screw access hole of the abutment. Additionally, the dental assembly may include an implant adapted for connection to the abutment via the screw. A prosthesis, which may include a driver access channel that has a diameter less than the outer diameter of the drive portion of the screw, may be placed over the abutment.

In another embodiment, a process for making a dental assembly includes designing the dental assembly to include a screw access hole and the slot in the sidewall of an abutment of the dental assembly and manufacturing the dental assembly.

In another embodiment, a method of attaching a prosthesis to a dental implant is provided. The method includes assembling a fixation screw through a screw access hole of an abutment and then fabricating the prosthesis, which includes a driver access channel, over the abutment. The abutment may be aligned with the dental implant and a driver may be passed through the driver access channel and rotated to drive the fixation screw.

In another embodiment, a method of detaching a prosthesis from a dental implant is provided. The method includes inserting a driver into a driver access channel of the prosthesis, which is affixed to an abutment, and rotating the driver to disengage a fixation screw from the dental implant. The abutment and prosthesis are then removed from the dental implant.

BRIEF DESCRIPTION OF THE DRAWINGS

The accompanying drawings, which are incorporated in and constitute a part of this specification, illustrate embodiments of the invention and, together with a general description of the invention given above, and the detailed description given below serve to explain various aspects of the invention.

DETAILED DESCRIPTION

Although the invention will be described next in connection with certain embodiments, the invention is not limited to practice in any one specific type of dental assembly. The description of the embodiments of the invention is intended to cover all alternatives, modifications, and equivalent arrangements as may be included within the spirit and scope of the invention as defined by the appended claims. In particular, those skilled in the art will recognize that the components of the embodiments of the invention described herein could be arranged in multiple different ways.

Figure 1:
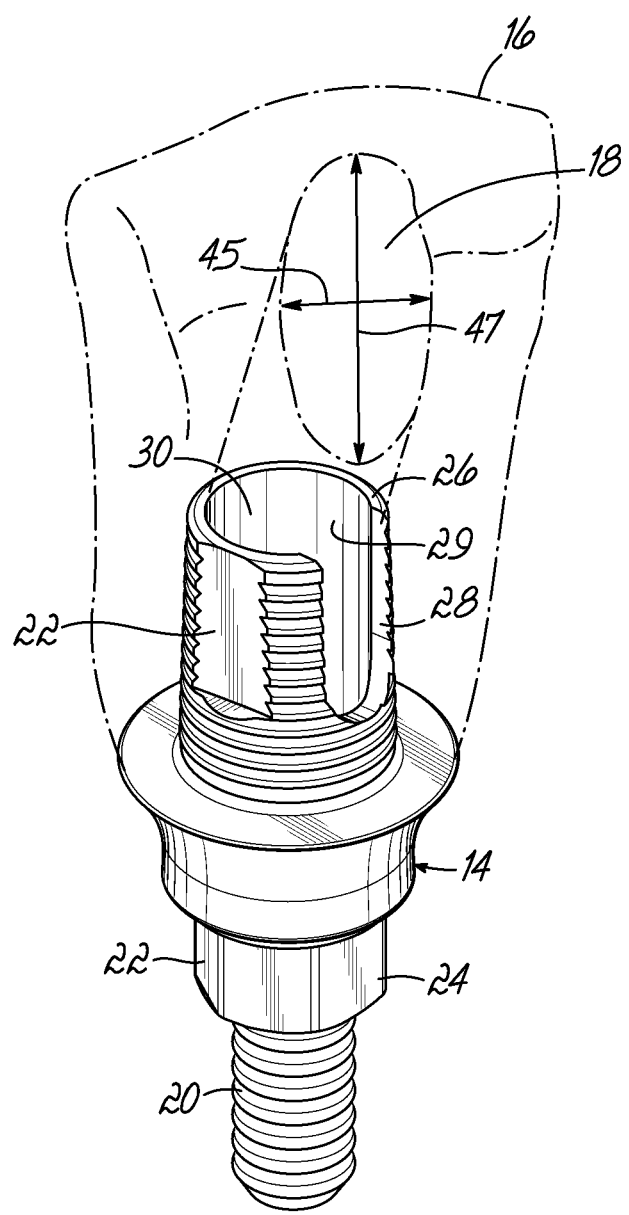
FIG. 1 is a diagrammatic view of a prosthesis affixed to an abutment with a fixation screw inserted therein.
Figure 2:
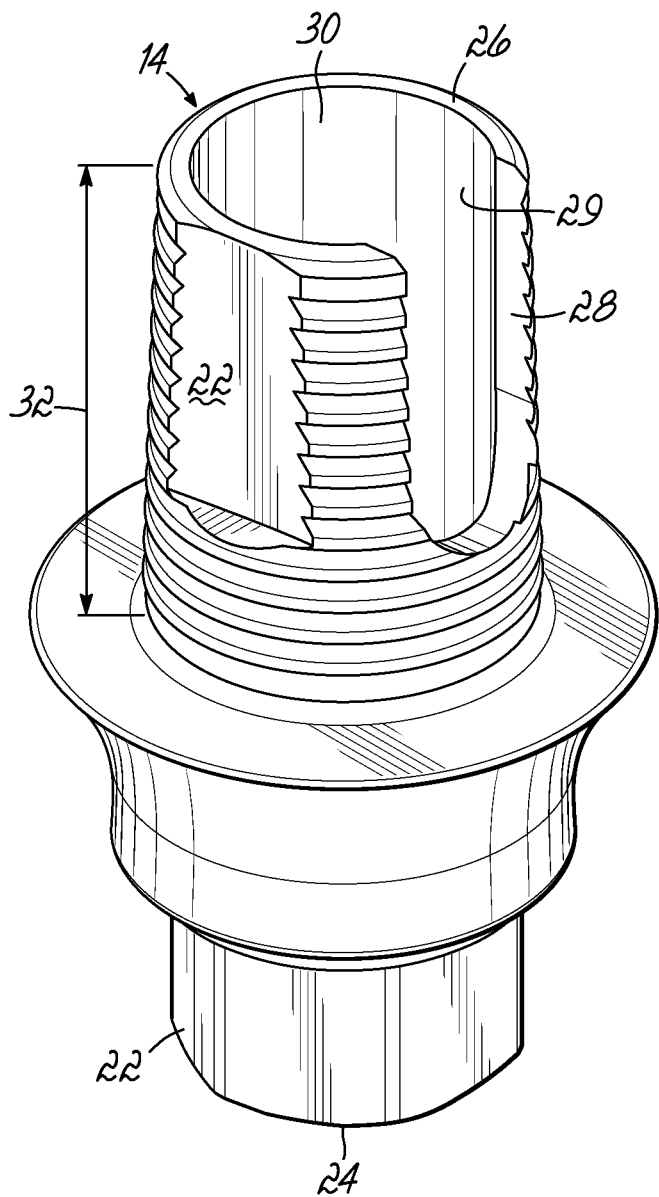
FIG. 2 is a detailed view of an abutment.
Figure 3:
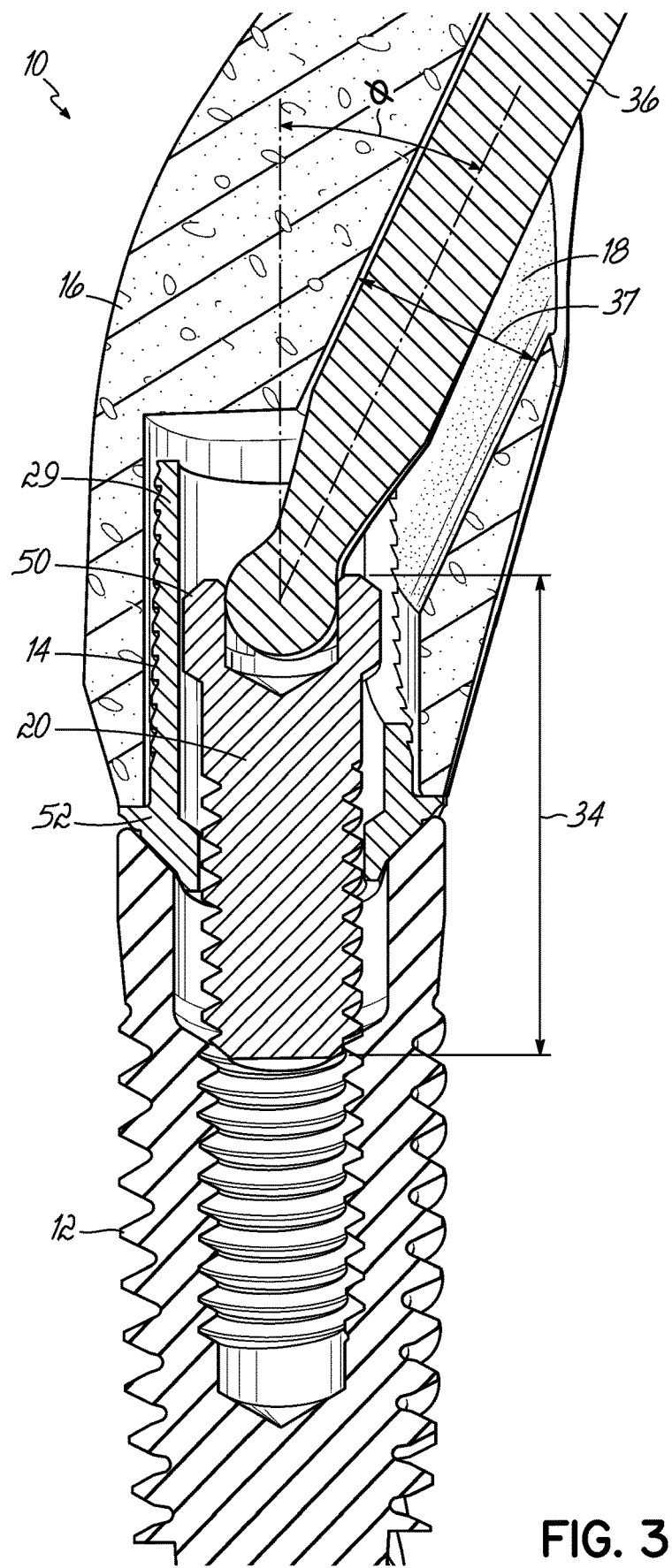
FIG. 3 is a diagrammatic cross-sectional view of a dental assembly with a driver engaged.
Figure 8A:
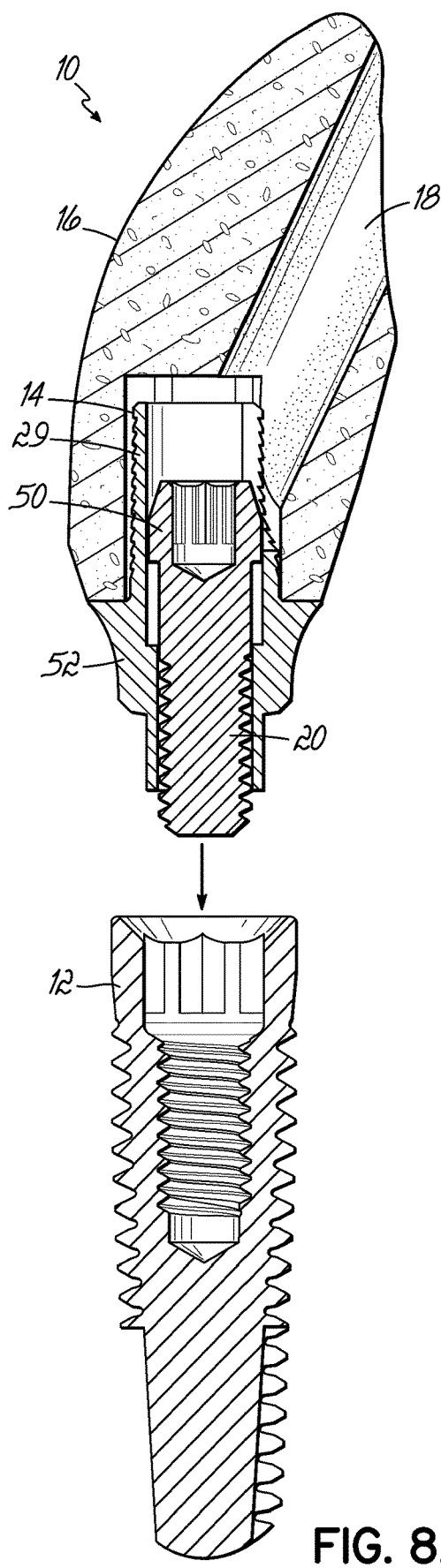
FIG. 8A is a diagrammatic cross-sectional view of a dental assembly.
Figure 8B:
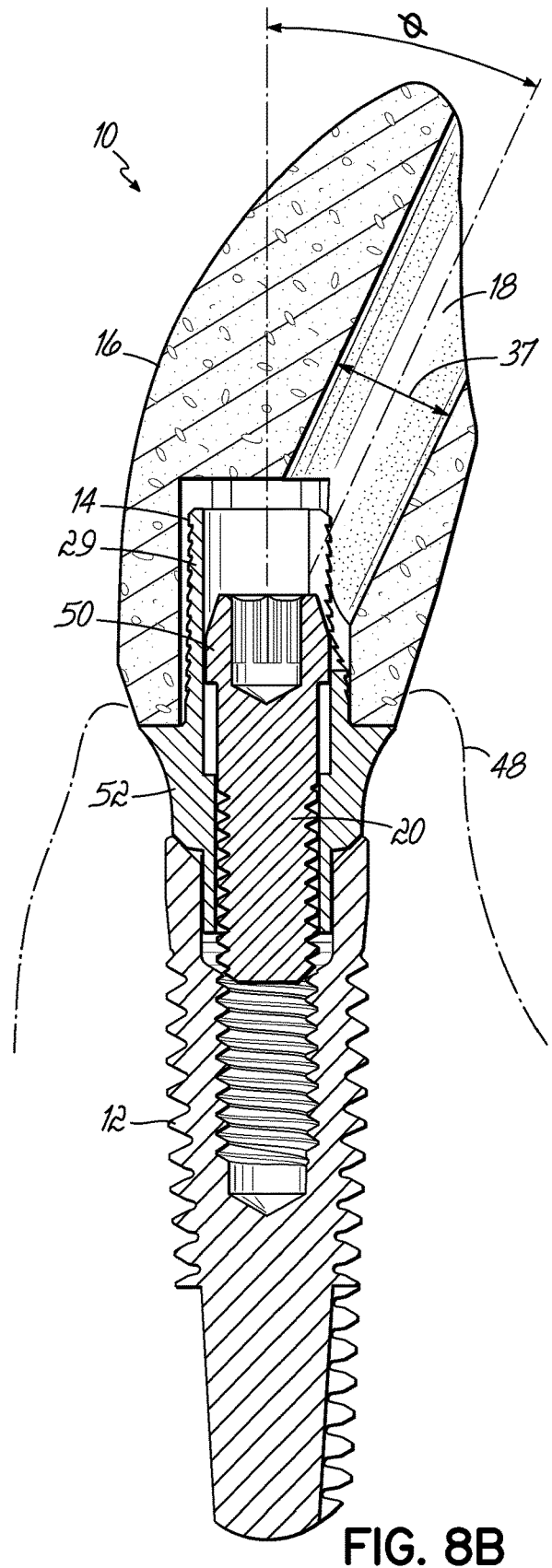
FIG. 8B is a diagrammatic cross-sectional view of a dental assembly implanted in a patient's jaw.
Figure 8C:
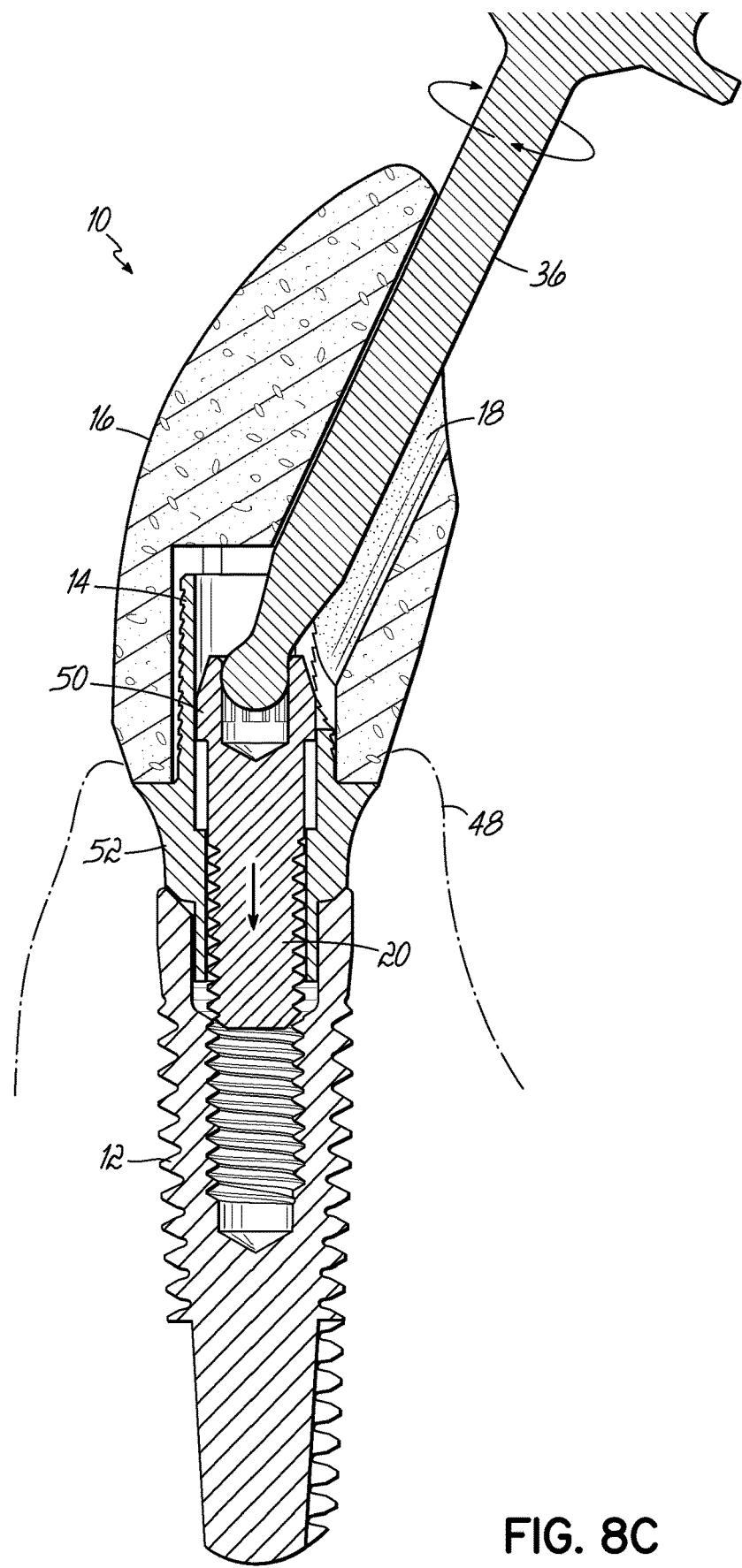
FIG. 8C is a diagrammatic cross-sectional view of a dental assembly with a driver engaged.
Figure 8D:
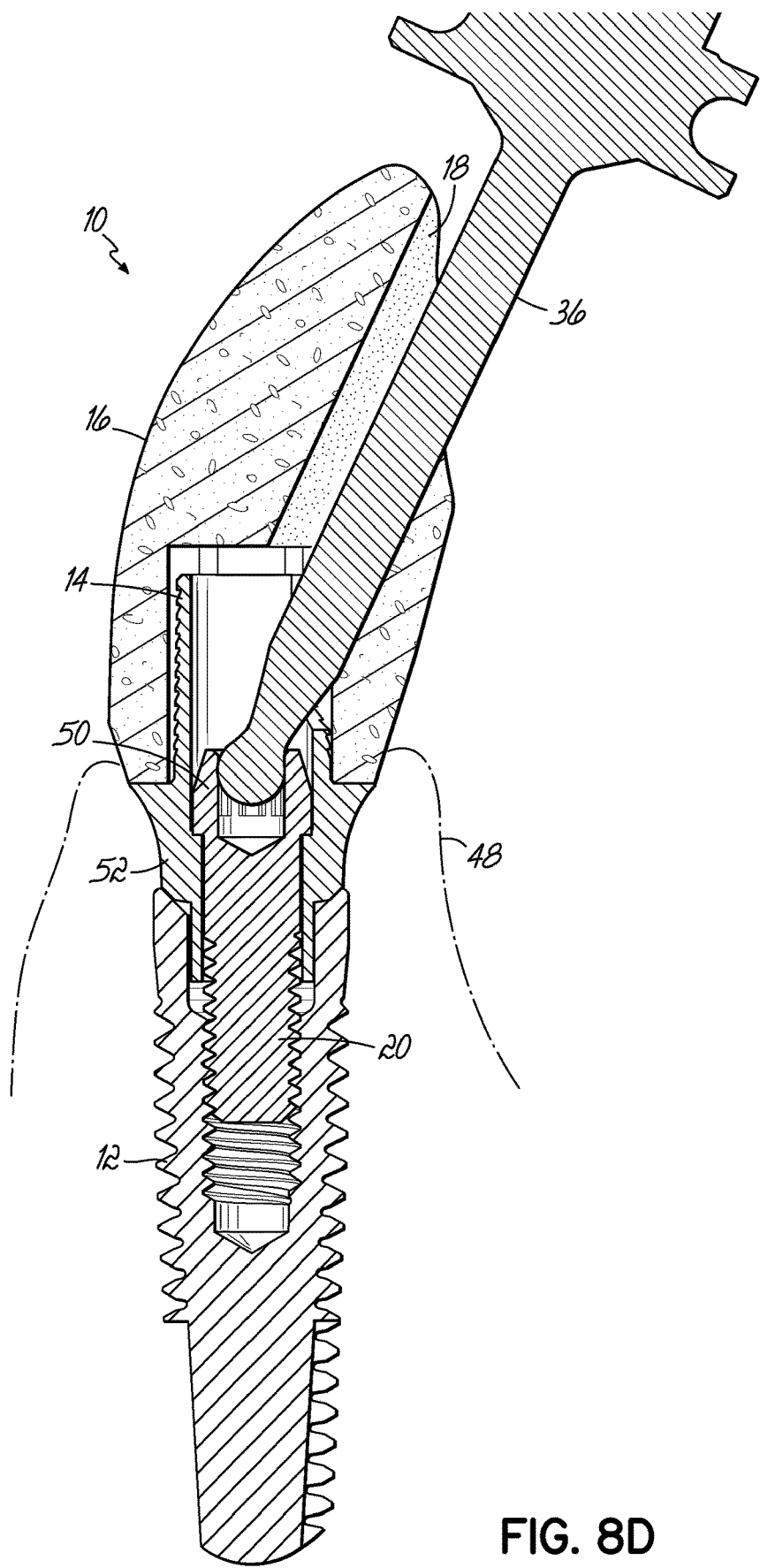
FIG. 8D is a diagrammatic cross-sectional view of a dental assembly with a driver engaged.

With reference now to the FIGS., a dental assembly 10 is shown with an implant 12, an abutment 14, and a prosthesis 16. In FIG. 1, prosthesis 16 is shown with driver access channel 18 at an angle θ off the longitudinal access of fixation screw 20 and implant 12, as best shown in FIGS. 3 and 8B. A detailed view of the abutment 14 is shown in FIG. 2. In the embodiment shown, the abutment may include an optional anti-rotation feature 22 at the apical region 24 of abutment 14 that interfaces with engaging features of the implant at its coronal end (not shown) to position the abutment 14 radially. Similarly, coronal region 26 of abutment 14 may include an optional anti-rotation feature 22 that interfaces with engaging features (not shown) of the prosthesis 16. Also, in the embodiment shown, the coronal region 26 of the abutment 14 may include grooves to improve securing, e.g. cementing, of the prosthesis 16 to the abutment 14.

Slot 28 in the sidewall 29 of abutment 14 allows a driver to access the fixation screw 20 at an angle. Such angular access allows for the placement of the driver access channel 18 on the lingual side of the prosthesis.

Abutment 14 also includes cavity 30 with a height 32 corresponding to the height 34 of the screw 20. In this way, the screw 20 may move upwardly when being disengaged from the implant 12 while the prosthesis 16 remains attached to the abutment 14. Therefore, the screw 20 need not ever be completely removed through the prosthesis 16, and the risk of inadvertent swallowing of the screw 20 during removal of the prosthesis 16 is decreased. Stated differently, the screw 20 may disengage the implant 12, but may also be contained within the cavity 30 of abutment 14.

Referring still to FIG. 2, the abutment 14 may be dual colored. The abutment 14 has an apical portion 24 configured to be positioned within a gingival region of a patient's mouth, and a coronal portion 26 configured to support the prosthesis 16. The apical portion 24 may be a first color, generally gingival-colored, and the coronal portion 26 may a second color different from the first color, generally tooth-colored. Such a dual-colored abutment allows for a more aesthetically pleasing installation. However, such dual coloring is optional.

Although the embodiments discussed herein are drawn toward single-unit dental assemblies, it is also possible to adapt the present invention to multi-unit bridge dental assemblies. In such an embodiment, the anti-rotational features 22 of the abutment 14 are not engaged by the implant 12. However, the cavity 30 of the coronal portion 26 of the abutment 14 is configured similarly to the cavity 30 of the single-unit dental assemblies.

Figure 4:
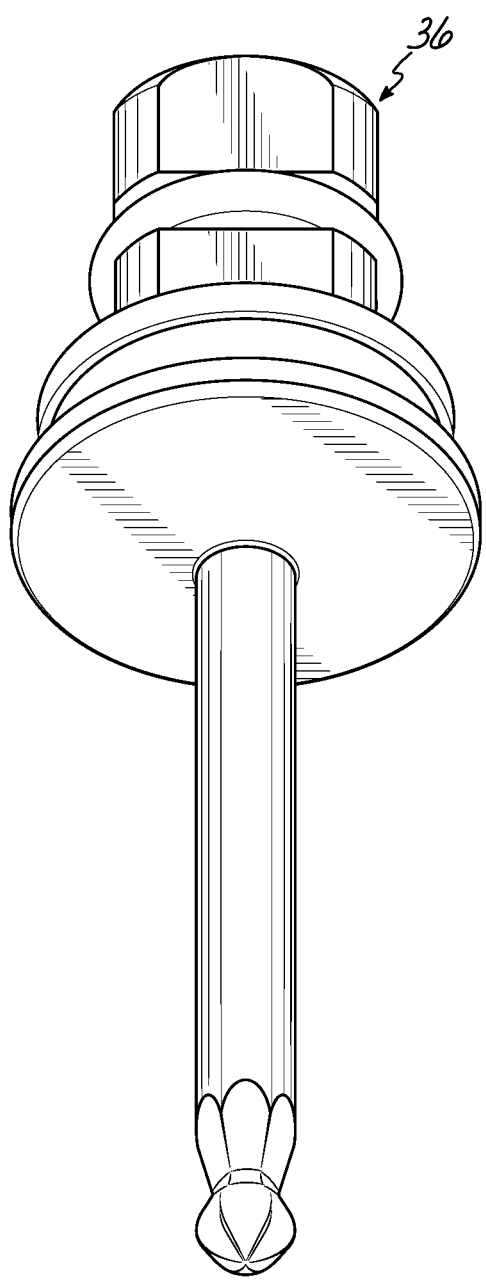
FIG. 4 is a diagrammatic view of a driver.

As shown in FIGS. 3 and 4, a conventional ball-point hex driver 36 may be used to drive fixation screw 20 through the abutment 14 and into the implant 12. The driver 36 passes through driver access channel 18, which may be sized such that driver 36 fits therethrough but screw 20 does not. Through the use of a ball-point hex driver 36, the user may change the angle θ of the driver 36 as driver 36 is rotated to insert or remove the screw 20. Alternatively, the user may hold the angle θ steady throughout the insertion and removal procedure. However, in applications where it is desirable to make the screw 20 removable, the radius 37 of driver access channel 18 may be widened to allow the screw 20 to pass fully therethrough.

The dental assembly may be made through two main steps. First, conventional or digital processes may be used to design the dental assembly, which will be unique to each patient and application. Then, the dental assembly may be manufactured either via conventional manufacturing techniques modified to include the driver access channel 18 or through computer-aided manufacturing techniques.

Figure 5:
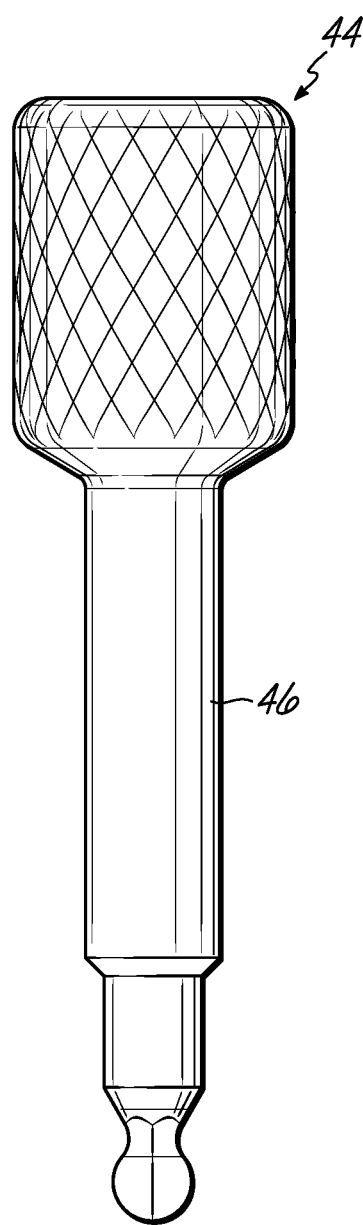
FIG. 5 is a diagrammatic view of a driver access channel analog.
Figure 6A:
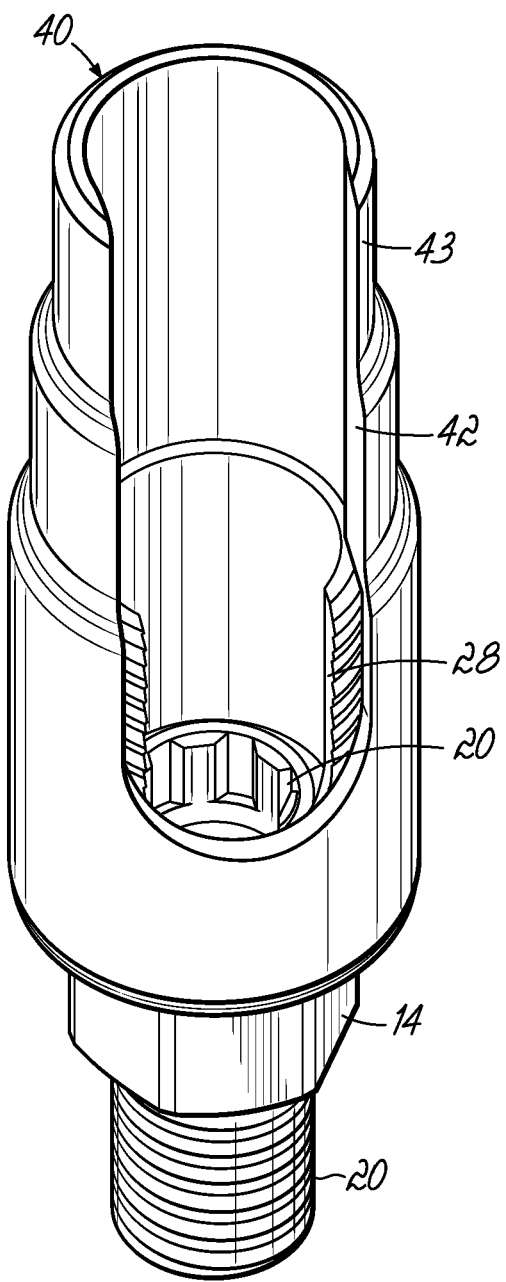
FIG. 6A is a diagrammatic view of an abutment and fixation screw assembly with a coping affixed.
Figure 6B:
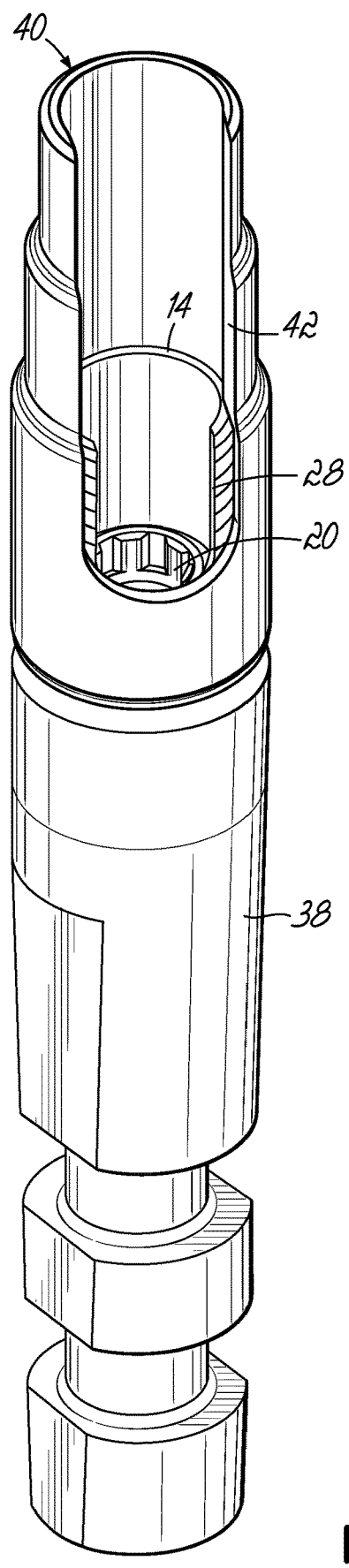
FIG. 6B is a diagrammatic view of an abutment, fixation screw, and coping assembly affixed to an implant analog.
Figure 6C:
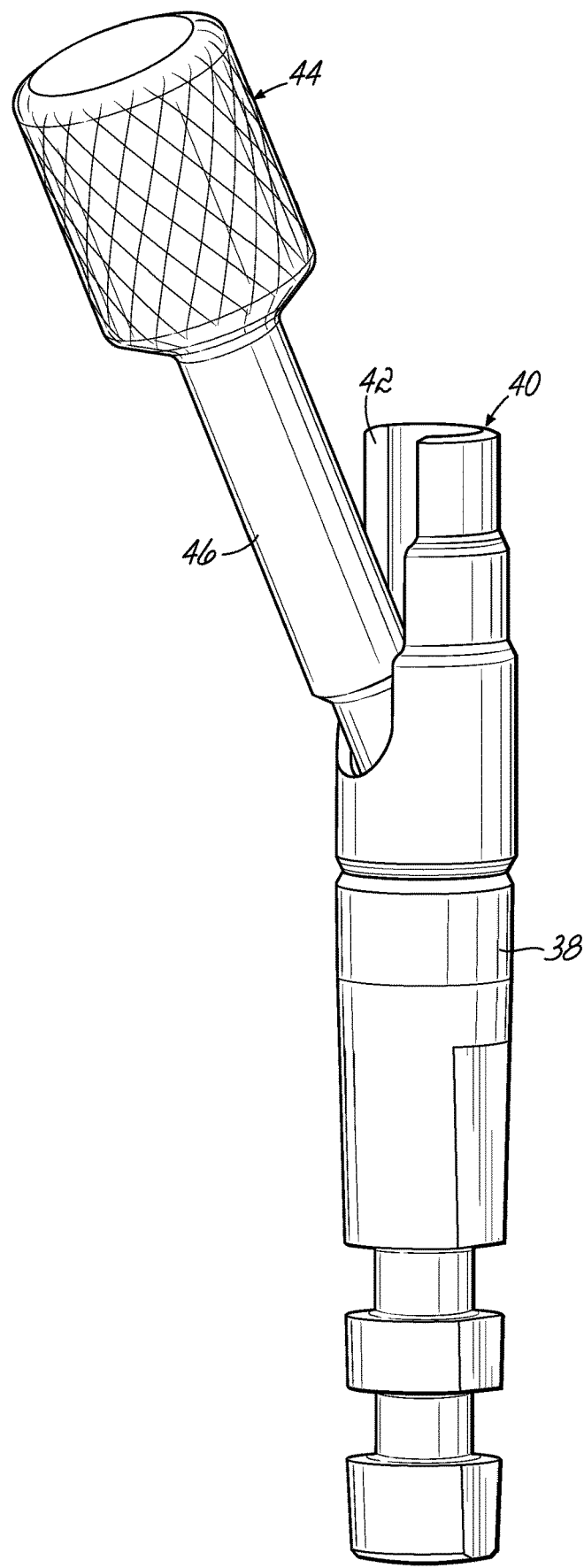
FIG. 6C is a diagrammatic view of an abutment, fixation screw, coping, and implant analog assembly with a driver access channel analog included therewith.
Figure 6D:
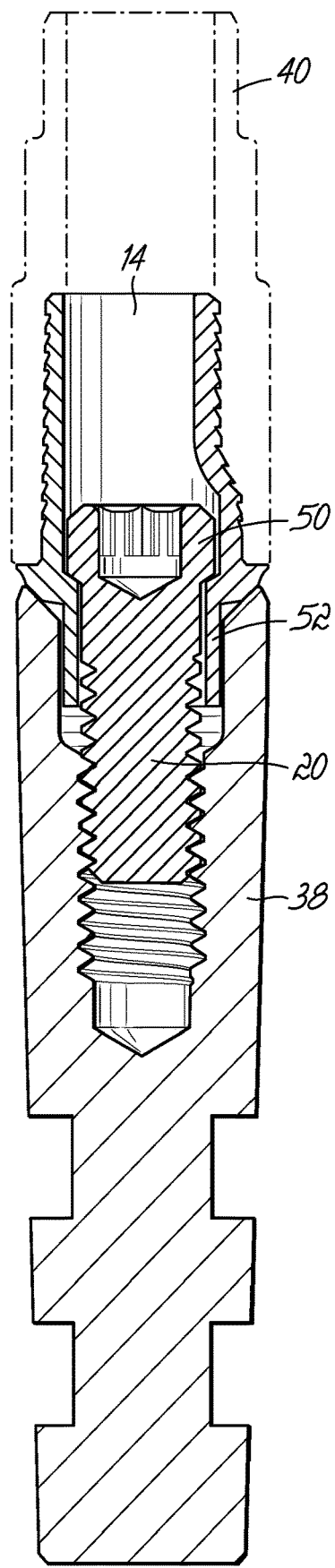
FIG. 6D is a diagrammatic cross-sectional view of an abutment, fixation screw, and coping assembly.

Turning now to FIGS. 5-6D, the prosthesis 16 may be formed by a modification to conventional methods. First, the dental professional makes an impression of the patient's oral cavity using conventional transfer techniques. Then, a stone model of the patient's jaw bone is created, including an implant analog 38 replicating the exact implant 12 orientation and height. Then the dental professional assembles abutment 14 onto implant analog 38 with screw 20, ensuring that slot 28 in the sidewall 29 of abutment 14 is oriented at the desired position. A coping 40 is placed onto abutment 14, again ensuring alignment of coping slot 42 in the sidewall 43 with abutment slot 28. An access-channel plug 44 may be placed into slots 28, 42 at the desired off-axis angle θ. The access-channel plug 44 will represent the driver access channel 18 within the completed prosthesis 16. Acrylic wax may then be placed around the coping 40 and access channel plug 44, and the plastic coping 40 may be modified as needed to create the desired prosthetic shape. Standard laboratory processes may be used to fabricate the prosthesis from the wax inverse negative thus formed. As a result, the formed prosthesis will contain a driver access channel 18 of the same diameter as the shaft 46 of access-channel plug 44, and screw 20 will be contained within abutment 14 in such a manner that it may not pass through the driver access channel 18 and is contained within the cavity 30 of abutment 14. Driver access channel 18 may thus have a generally elliptical shape with a long axis 45 and a short axis 47, as best shown in FIG. 1. The long axis 45 is configured to allow the driver 36 to move along the driver access channel 18 to contact the screw continuously during rotation of the driver 36.

Alternatively, prosthesis 16 may be formed using a digital workflow procedure. First, the dental professional conducts an intra-oral or impression scan using digital impression techniques. The data thus generated are imported into software that determines implant or abutment height as well as the required orientation of the engaging features. This or other software may then be used to determine the correct linear, axial, and rotational location of the dental assembly components, including the desired location and orientation of the side feature 28 of abutment 14. Software also designs the prosthesis with an appropriate off-axis drive access channel. Finally, the prosthesis is fabricated following computer-aided manufacturing procedures.

Figure 7:
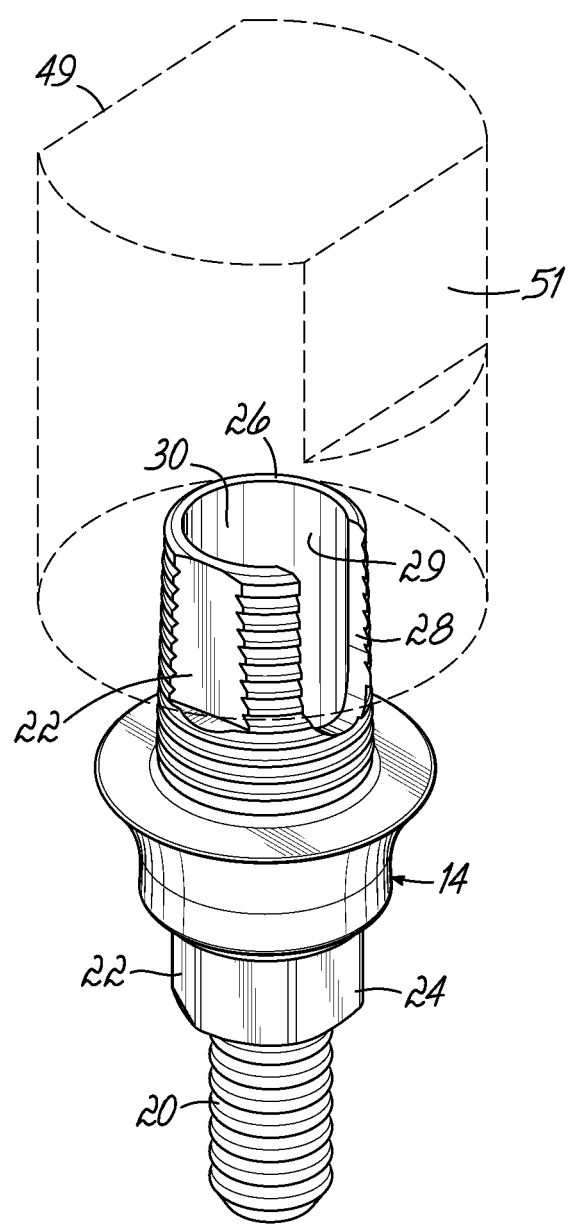
FIG. 7 is a diagrammatic view of a computer model of an implant, abutment, and prosthesis blank.

An exemplary computer-aided manufacturing process using a 3SHAPE® CAD/CAM system is provided for further illustration. First, data obtained from either an intra-oral or impression scan of the patient's oral cavity are imported into the CAD system. Then, a computer model of the implant 12 and abutment 14, the abutment 14 having a slot 28 in its sidewall 29, is combined with a computer model of a prosthesis blank 49 in silico. The prosthesis blank 49 includes a scan adapter flat 51 that is aligned with the slot 28 in the sidewall 29 of the abutment 14. See FIG. 7. The implant 12, abutment 14, and prosthesis blank 49 are placed within a visual depiction of the patient's oral cavity in the appropriate location, with the scan adapter flat 51 aligned in the desired direction of the off-axis driver access channel 18. The angle of this off-axis driver access channel 18 may be modified, as desired, in silico. The design software can then be used to transform the prosthesis blank 49 into an appropriate prosthesis 16 that includes the off-axis driver access channel 18.

Once the design of the dental assembly 10 is complete, the actual prosthesis 16 may be formed from a milling process using the data obtained from the CAD software. The milled prosthesis 16 may then be attached to an abutment 14 and implant 12 using cement, for example. It may be beneficial to insert an access channel plug 44 into the off-axis driver access channel 18 during the attachment of the prosthesis 16 to the abutment 14 to protect the screw 20 from the cement. Indeed, the access channel plug 44 may be used to align the prosthesis 16 by inserting the access channel plug 44 into the head 50 of the screw 20 and then passing the prosthesis 16 over the access channel plug 44 and onto the abutment 14. Once the prosthesis 16 is formed and attached to the abutment 14 and implant 12, the resulting dental assembly 10 may then be placed inside the patient's oral cavity.

Turning now to FIGS. 8A-8D, dental assembly 10 may be assembled as follows. Implant 12 may be installed in the patient's jaw 48 using conventional procedures. Pre-assembled abutment 14 and prosthesis 16, which contains fixation screw 20, may be aligned with implant 12. Driver 36 may be used to drive fixation screw 20 through abutment 14 and into implant 12. Conveniently, head 50 of screw 20 may rest in screw seat 52 of abutment 14. Screw seat 52 may be formed from titanium or some other similarly strong metal, thus reducing the risk of deformation or cracking during the screw tightening procedure. Removal of the prosthesis may then be accomplished by the reverse of the installation procedure detailed above.

While the present invention has been illustrated by the description of one or more embodiments thereof, and while the embodiments have been described in considerable detail, they are not intended to restrict or in any way limit the scope of the appended claims to such detail. The various features shown and described herein may be used alone or in any combination. Additional advantages and modifications will readily appear to those skilled in the art. The invention in its broader aspects is therefore not limited to the specific details, representative apparatus and method and illustrative examples shown and described. Accordingly, departures may be from such details without departing from the scope of the general inventive concept.

What is claimed is:

1. A dental assembly, comprising:
    a screw for attaching the dental assembly to a dental implant;
    an abutment with a longitudinal axis, the abutment including a coronal portion and an apical portion along the longitudinal axis, the apical portion being configured to be received within the dental implant, the coronal portion defining a sidewall, the sidewall at least partially surrounding a cavity configured to receive the screw along the longitudinal axis, the sidewall including a slot therethrough and open to the cavity; the slot is sized to allow insertion of a driver therethrough to access the screw in the cavity; and
    a prosthesis having a driver access channel and receiving the coronal portion of the abutment with the screw in the cavity and the driver access channel aligned with the slot, the aligned driver access channel and slot are configured to allow the driver to be received therethrough at an angle relative to the longitudinal axis to access a driver-receiving bore in the screw, the screw is not passable through the driver access channel and the screw is contained within the cavity of the abutment.

2. The dental assembly of claim 1, wherein the abutment further comprises at least one anti-rotational feature.

3. The dental assembly of claim 1, wherein the apical portion of the abutment is gingival colored and the coronal portion of the abutment is tooth colored.

4. The dental assembly of claim 1, wherein the abutment further comprises at least one implant engaging feature.

5. The dental assembly of claim 1, wherein the angle relative to the longitudinal axis greater than 0° to 35°.

6. The dental assembly of claim 1, further comprising a dental implant adapted for connection to the abutment via the screw.

7. The dental assembly of claim 6, wherein the apical portion is received within the dental implant.

8. The dental assembly of claim 7, wherein the abutment is a unitary piece.

9. The dental assembly of claim 1, wherein the driver access channel has an internal cross dimension less than an external cross dimension of a drive portion of the screw.

10. The dental assembly of claim 1, wherein the screw cannot pass through the driver access channel from the cavity.

11. The dental assembly of claim 1, wherein the abutment is a unitary piece.

12. The dental assembly of claim 1, wherein the driver access channel has an internal cross dimension sized to allow a driver to pass therethrough and to prevent the screw from passing therethrough.

13. A process for attaching a prosthesis to a dental implant, the process comprising:
    assembling a fixation screw into an abutment including a longitudinal axis; a sidewall defining a cavity along the longitudinal axis; a slot in the sidewall, the slot being sized to allow a driver to access the fixation screw in the cavity through the slot in the sidewall at an angle relative to the longitudinal axis; and an apical portion extending along the longitudinal axis and being configured to be received within the dental implant;
    fabricating the prosthesis, the prosthesis including a driver access channel;
    attaching the prosthesis to the abutment;
    inserting the apical portion of the abutment into the dental implant;
    inserting a driver into the driver access channel, through the slot, and into engagement with the fixation screw; and
    driving the driver to rotate the fixation screw, thereby attaching the prosthesis to the dental implant,
    wherein once assembled, the screw is not passable through the driver access channel, and the screw is contained within the cavity of the abutment.

14. A process for detaching a prosthesis from a dental implant, the process comprising:
- inserting a driver into a driver access channel in the prosthesis, the prosthesis affixed to an abutment and the abutment secured to the dental implant by a fixation screw, the abutment including a longitudinal axis; a sidewall defining a cavity along the longitudinal axis; a slot in the sidewall, the slot being sized to allow the driver to access a fixation screw in the cavity through the slot in the sidewall at an angle relative to the longitudinal axis; and an apical portion extending along the longitudinal axis and being received within the dental implant;
- engaging the driver with the fixation screw in the cavity through the driver access channel of the prosthesis and through the slot in the abutment;
- rotating the driver to disengage the fixation screw from the dental implant; and
- removing the abutment and the prosthesis from the dental implant,
- wherein once assembled, the screw is not passable through the driver access channel, and the screw is contained within the cavity of the abutment whereby during removing, an assembly of the abutment and the prosthesis captures the fixation screw between the abutment and the prosthesis.

15. A dental assembly, comprising:
- a screw for attaching the dental assembly to a dental implant;
- an abutment including a sidewall and an apical portion that define a longitudinal axis, the apical portion being configured to be received within the dental implant, the sidewall at least partially surrounding a cavity configured to receive the screw along the longitudinal axis, and the sidewall including a slot therethrough and open to the cavity, and when the screw is in the cavity, the slot allows a driver to access a driver-receiving bore in the screw at an angle relative to the longitudinal axis; and
- a prosthesis having a driver access channel, wherein when the prosthesis is assembled to the abutment with the screw in the cavity and the driver access channel is aligned with the slot and the screw is accessible with a driver through the driver access channel and the slot, the screw is not passable through the driver access channel and the screw is contained within the cavity of the abutment,
- wherein the driver access channel has a first opening on at least one surface of the prosthesis, the first opening of the driver access channel is an elliptical shape having a long axis and a short axis, the long axis being parallel to the longitudinal axis and being configured to allow the driver to move in the direction of the longitudinal axis and along the driver access channel to contact the screw continuously during rotation of the driver.

16. The dental assembly of claim 15, wherein the driver access channel has a second opening opposite the first opening, and wherein a central axis of the second opening is angled relative to the longitudinal axis of the abutment.

17. The dental assembly of claim 15, wherein a length of the long axis is equal to a distance that the screw is threadably engageable with the dental implant.

* * * * *